US008192869B2

(12) United States Patent
Teramoto

(10) Patent No.: US 8,192,869 B2
(45) Date of Patent: Jun. 5, 2012

(54) LITHIUM ION SECONDARY BATTERY AND A METHOD FOR MANUFACTURING THE SAME

(75) Inventor: Jun Teramoto, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 635 days.

(21) Appl. No.: 12/362,034

(22) Filed: Jan. 29, 2009

(65) Prior Publication Data

US 2009/0197177 A1 Aug. 6, 2009

(30) Foreign Application Priority Data

Jan. 31, 2008 (JP) ................................ 2008-021144
Jan. 20, 2009 (JP) ................................ 2009-009695

(51) Int. Cl.
*H01M 4/58* (2010.01)

(52) U.S. Cl. ................................ 429/231.5; 429/218.1

(58) Field of Classification Search ................ 429/231.5
See application file for complete search history.

(56) References Cited

U.S. PATENT DOCUMENTS

2007/0087269 A1* 4/2007 Inda ............................ 429/322
2007/0175020 A1* 8/2007 Nagata et al. ................ 29/623.3
2007/0259271 A1 11/2007 Nanno et al.

OTHER PUBLICATIONS

European Search Report dated Apr. 7, 2009, issued in corresponding European Patent Application No. 09151699.

* cited by examiner

*Primary Examiner* — Barbara Gilliam
*Assistant Examiner* — Gary Harris
(74) *Attorney, Agent, or Firm* — Westerman, Hattori, Daniels & Adrian, LLP

(57) ABSTRACT

A method for manufacturing a lithium ion secondary battery includes steps of preparing a green sheet comprising at least one of lithium ion conductive inorganic powder and inorganic powder which becomes lithium ion conductive when it is heat treated; producing a thin film solid electrolyte by heat treating the green sheet; laminating an electrode green sheet comprising an active material on at least one surface of the thin film solid electrolyte; and heat treating the electrode green sheet at a temperature which is lower than a temperature at which the solid electrolyte is heat treated.

9 Claims, No Drawings

LITHIUM ION SECONDARY BATTERY AND A METHOD FOR MANUFACTURING THE SAME

BACKGROUND OF THE INVENTION

This invention relates to a fully solid type lithium ion secondary battery and a method for manufacturing the same.

As an electrolyte in a lithium ion secondary battery, an electrolyte in which a porous film called a separator is impregnated with a non-aqueous electrolytic solution has been generally used. Since this type of electrolyte is likely to cause leakage of liquid or combustion, there has recently been a proposal for using, instead of such electrolyte comprising liquid, a fully solid battery which uses an inorganic solid electrolyte. The fully solid battery which does not use a combustible organic solvent such as an electrolytic solution has no risk of leakage of liquid or combustion and therefore has excellent safety. Since, however, components of the fully solid battery, i.e., a positive electrode, an electrolyte and a negative electrode, are all made of solid substance, it has difficulty in securing sufficient contact in its interfaces between the positive electrode and the electrolyte and the negative electrode and the electrolyte resulting in increase in resistance in the interfaces. In this case, lithium ion conductivity in the interfaces between the electrolyte and the electrodes is not sufficiently high and, for this reason, such fully solid battery has not been offered for practical use yet.

As a method for manufacturing such fully solid battery efficiently, it is conceivable to prepare green sheets of a solid electrolyte and positive and negative electrodes from slurries which respectively comprise powder of specific compositions, and laminate such green sheet of the solid electrolyte, green sheet of the positive electrode and green sheet of the negative electrode together to provide a laminate of a lithium ion secondary battery.

In this case, there is the problem that, since the solid electrolyte, positive electrode and negative electrode are made of materials which differ from one another and have different optimum sintering temperatures from one another, if the green sheets of the solid electrolyte, positive electrode and negative electrode are sintered in their laminated state at a single temperature as a package, a warp or cracking occurs in the completed solid battery and the best properties of the solid electrolyte, positive electrode and negative electrode cannot be demonstrated sufficiently. For overcoming this problem, the materials of the solid electrolyte, positive electrode and negative electrode must be adjusted for obtaining an optimum sintering temperature which is common to these materials and, as a result, limitation is imposed to capacity and output of the battery.

It is, therefore, an object of the invention to provide a method for manufacturing a fully solid type lithium ion secondary battery having sufficient ion conductivity in an efficient manner.

SUMMARY OF THE INVENTION

For achieving the above described object of the invention, as a result of studies and experiments made by the inventor of the present invention, it has been found, which has led to the present invention, that by sintering a solid electrolyte, positive electrode and negative electrode in the order from a material having a higher sintering temperature and assembling them in the order from a material which has completed sintering, the solid electrolyte, positive electrode and negative electrode are respectively sintered at their optimum sintering temperatures and a battery made by assembling these components has the highest ion conductivity.

For achieving the object of the invention, in the first aspect of the invention, there is provided a method for manufacturing a lithium ion secondary battery comprising:

preparing a green sheet comprising at least one of lithium ion conductive inorganic powder and inorganic powder which becomes lithium ion conductive when it is heat treated;

producing a thin film solid electrolyte by heat treating the green sheet;

laminating an electrode green sheet comprising an active material on at least one surface of the thin film solid electrolyte; and heat treating the electrode green sheet at a temperature which is lower than a temperature at which the solid electrolyte is heat treated.

In the second aspect of the invention, there is provided a method as defined in the first aspect wherein, assuming that the green sheet comprising at least one of lithium ion conductive inorganic powder and inorganic powder which becomes lithium ion conductive when it is heat treated is heat treated at a first heat treating temperature, the electrode green sheet comprising an active material laminated on one surface of the thin film solid electrolyte is heat treated at a second heat treating temperature, and an electrode green sheet comprising an active material laminated on the other surface of the solid electrolyte is heat treated at a third heat treating temperature, the second heat treating temperature is lower than the first heat treating temperature, and the third heat treating temperature is the same as or lower than the second heat treating temperature.

In the third aspect of the invention, there is provided a method as defined in the first or second aspect wherein the first heat treating temperature is 1200° C. or below.

In the fourth aspect of the invention, there is provided a method as defined in any of the first to third aspects wherein the second heat treating temperature and the third heat treating temperature are lower than the first heat treating temperature by 50° C. or over.

In the fifth aspect of the invention, there is provided a method as defined in any of the first to fourth aspects wherein volume of the thin film solid electrolyte is 50 volume % or over of volume of the green sheet from which the thin film solid electrolyte is produced.

In the sixth aspect of the invention, there is provided a method as defined in any of the first to fifth aspects wherein the thin film solid electrolyte has thickness of 500 μm or below.

In the seventh aspect of the invention, there is provided a method as defined in any of the first to sixth aspects wherein the lithium ion conductive inorganic powder or the inorganic powder which becomes lithium ion conductive when it is heat treated has an average particle diameter of 3 μm or below and a maximum particle diameter of 15 μm or below.

In the eighth aspect of the invention, there is provided a method as defined in any of the first to seventh aspects wherein ion conductivity of the lithium ion conductive inorganic powder or ion conductivity after the heat treatment of the inorganic powder which becomes lithium ion conductive when it is heat treated is $1\times10^{-4} S\cdot cm^{-1}$ or over at 25° C.

In the ninth aspect of the invention, there is provided a method as defined in the eighth aspect wherein ion conductivity after the heat treatment of the green sheet comprising the lithium ion conductive inorganic powder or the inorganic powder which becomes lithium ion conductive when it is heat treated is $5\times10^{-5} S\cdot cm^{-1}$ or over at 25° C.

In the tenth aspect of the invention, there is provided a method as defined in any of the first to ninth aspects wherein the lithium ion conductive inorganic powder has a crystal of $Li_{1+x+z}M_x(Ge_{1-y}Ti_y)_{2-x}Si_zP_{3-z}O_{12}$ ($0 \leqq x \leqq 0.8$, $0 \leqq y \leqq 1.0$, $0 \leqq z \leqq 0.6$ and M is one or both of Al and Ga).

In the eleventh aspect of the invention, there is provided a method as defined in any of the first to tenth aspects wherein the inorganic powder which becomes lithium ion conductive when it is heat treated comprises, in mol % on oxide basis:

| | |
|---|---|
| $Li_2O$ | 10-25% |
| $Al_2O_3$ and/or $Ga_2O_3$ | 0.5-15% |
| $TiO_2$ and/or $GeO_2$ | 25-50% |
| $SiO_2$ | 0-15% and |
| $P_2O_5$ | 26-40%. |

In the twelfth aspect of the invention, there is provided a lithium ion secondary battery manufactured by a method as defined in any of the first to eleventh aspects.

When a solid electrolyte, positive electrode and negative electrode are produced by materials which are optimum materials for composing a lithium ion secondary battery, sintering temperatures of the positive electrode and the negative electrode are lower than sintering temperature of the solid electrolyte. According to the first aspect of the invention, by preparing a green sheet comprising at least one of lithium ion conductive inorganic powder and inorganic powder which becomes lithium ion conductive when it is heat treated, producing a thin film solid electrolyte by heat treating the green sheet, laminating an electrode green sheet comprising an active material on both surfaces of the thin film solid electrolyte, and heat treating the electrode green sheets at a temperature which is lower than a temperature at which the solid electrolyte is heat treated, the solid electrolyte, positive electrode and negative electrode are sintered respectively at their optimum sintering temperatures whereby a lithium ion secondary battery having excellent ion conductivity can be produced.

According to the third aspect of the invention, by setting the first heat treating temperature of the solid electrolyte at 1200° C. or below, the solid electrolyte after heat treatment has ion conductivity of $10^{-5}S \cdot cm^{-1}$.

If the first heat treating temperature exceeds 1200° C., the lithium ion conductive inorganic powder or the inorganic powder which becomes lithium ion conductive when it is heat treated or both contained in the solid electrolyte are melted and, therefore, the first heat treating temperature should be more preferably 1150° C. or below and most preferably 1100° C. or below.

As to the lower limit, from the standpoints of sintering temperature of sintering between particles of the lithium ion conductive inorganic powder and a temperature at which the inorganic powder which becomes lithium ion conductive when it is heat treated becomes lithium ion conductive, the first heat treating temperature should be preferably 600° C. or over, more preferably 650° C. or over and most preferably 700° C. or over.

According to the fourth aspect of the invention, by making the second heat treating temperature and the third heat treating temperature lower than the first heat treating temperature by 50° C. or over, the positive electrode and the negative electrode can be formed by materials having ion conductivity and other properties which are most suited for a lithium ion secondary battery. For this purpose, the second and third heat treating temperatures should be lower than the first heat treating temperature by more preferably 100° C. or over and most preferably 150° C. or over.

According to the fifth aspect of the invention, by setting volume of the thin film solid electrolyte at 50 volume % or over of volume of the green sheet from which the thin film solid electrolyte is produced, tightening of the solid electrolyte can be realized while deformation due to shrinkage during sintering is prevented. For this purpose, volume of the thin film solid electrolyte should be more preferably 55 volume % or over and most preferably 60 volume % or over of volume of the green sheet from which the thin film solid electrolyte is produced.

According to the sixth aspect of the invention, by setting thickness of the thin film solid electrolyte at 500 μm or below, moving distance of lithium ion is shortened and a battery having a high output thereby can be produced and, moreover, an electrode area per unit volume can be broadened and a battery having a high capacity thereby can be produced. For obtaining such effects, the thickness of the solid electrolyte should be more preferably 400 μm or below and most preferably 300 μm or below.

According to the seventh aspect of the invention, by making the lithium ion conductive inorganic powder or the inorganic powder which becomes lithium ion conductive when it is heat treated have an average particle diameter of 3 μm or below and a maximum particle diameter of 15 μm or below, a solid electrolyte which is tight and has few voids and has high ion conductivity can be produced.

DESCRIPTION OF PREFERRED EMBODIMENTS

Description will now be made about preferred embodiments of the invention.

A lithium ion secondary battery of the invention can be produced by preparing a green sheet comprising at least one of lithium ion conductive inorganic powder and inorganic powder which becomes lithium ion conductive when it is heat treated, producing a thin film solid electrolyte by heat treating the green sheet, laminating an electrode green sheet comprising an active material on both surfaces of the thin film solid electrolyte, and heat treating the electrode green sheets at a temperature which is lower than a temperature at which the solid electrolyte is heat treated.

Assuming that the green sheet comprising at least one of lithium ion conductive inorganic powder and inorganic powder which becomes lithium ion conductive when it is heat treated is heat treated at a first heat treating temperature, the electrode green sheet comprising an active material laminated on one surface of the thin film solid electrolyte is heat treated at a second heat treating temperature, and an electrode green sheet comprising an active material laminated on the other surface of the solid electrolyte is heat treated at a third heat treating temperature, the second heat treating temperature is lower than the first heat treating temperature, and the third heat treating temperature is the same as or lower than the second heat treating temperature.

The thin film solid electrolyte can be produced by sintering a green sheet comprising lithium ion conductive inorganic powder or inorganic powder which becomes lithium ion conductive when it is heat treated or both.

If pores exist in the thin film solid electrolyte, no ion conducting path exists in such pores and, as a result, ion conductivity of the solid electrolyte itself is deteriorated. In case the electrolyte is used in a battery, the higher the ion conductivity is, the higher becomes mobility of lithium ion and a battery having a higher output thereby can be produced. Therefore, a low rate of pores in the solid electrolyte is desirable and should be preferably 20 vol % or below. For making the rate of pores to 20 vol % or below, the solid electrolyte should be preferably made of a green sheet.

In the present specification, the term "green sheet" means an unsintered material which comprises unsintered glass powder or unsintered ceramic powder such as inorganic oxides mixed with an organic binder, plasticizer and solvent and is formed to a thin film. This forming of the thin film green sheet from the mixed slurry can be made by a coating method such as using a doctor blade or a calendaring, spin coating or dip coating, a printing method such as using ink jet, Bubble Jet (trademark) or offsetting, a die coater method or a spray method. The thin film green sheet is generally prepared by forming the mixed slurry on a film made of, e.g., a PET film, which has been applied with a releasing treatment and releasing the thin film green sheet after drying it. Alternatively, the mixed slurry may be formed directly on a material such as ceramic to which the mixed slurry should be laminated and the layer prepared by this method may be included in the meaning of green sheet. The green sheet before sintering is soft and can be cut into a desired shape or laminated to other member.

According to the invention, by forming the green sheet to a uniform thickness, the green sheet is heated uniformly during sintering and sintering proceeds uniformly throughout the material and, as a result, a solid electrolyte in the form of a sheet which is tight and has a low rate of pores of 20 vol % or below can be provided. For this reason, variation in thickness of the green sheet before sintering should preferably be within a range from +10% to −10% to an average value of distribution of the thickness of the green sheet before sintering. Further, by blending raw materials sufficiently, the composition of the green sheet can be made uniform and, by pressing and thereby tightening the green sheet by using a roll press or a monoaxial, isotropic pressing method, an solid electrolyte which is tight and has a low rate of pores can be provided whereby a solid electrolyte having high ion conductivity and high output can be provided. It is desirable that mixing of raw materials should be made in, e.g., a ball mill for at least one hour.

The thinner is the solid electrolyte in the form of a sheet which is preferable as the lithium ion secondary battery of the invention, the shorter is the moving distance of lithium ion and, as a result, a battery of a higher output can be provided. Further, by making the solid electrolyte thinner, a broader area of the electrode per unit volume can be secured and, as a result, a battery of a higher capacity can be provided. Therefore, thickness of the electrolyte layer used as the solid electrolyte should be preferably 500 μm or below, more preferably 400 μm or below and most preferably 300 μm or below.

Mobility of lithium ion during charge and discharge of a lithium ion secondary battery depends upon lithium ion conductivity and lithium ion transport number of the electrolyte. Therefore, it is preferable to use a material having high lithium ion conductivity as the solid electrolyte of the present invention.

Ion conductivity of the lithium ion conductive powder after heat treatment or the powder which becomes lithium ion conductive when it is heat treated after heat treatment should be preferably $1\times10^{-4}$ S·cm$^{-1}$ or over, more preferably $5\times10^{-4}$ S·cm$^{-1}$ or over and most preferably $1\times10^{-3}$ S·cm$^{-1}$ or over.

The lithium ion conductive inorganic powder used in the present invention is powder of a lithium ion conductive crystal (ceramic or glass-ceramics) or powder of an inorganic substance comprising powder of mixture thereof. The inorganic powder which becomes lithium ion conductive when it is heat treated is glass powder which becomes glass-ceramics by heat treatment.

Lithium ion conductivity herein means that the degree of lithium ion conductivity exhibits a value of $1\times10^{-8}$ S·cm$^{-1}$ or over at 25° C.

The inorganic powder which becomes lithium ion conductive when it is heat treated should preferably comprise, in mol % on oxide basis $Li_2O$ in an amount of 10-25%, $Al_2O_3$ and/or $Ga_2O_3$ in an amount of 0.5-15%, $TiO_2$ and/or $GeO_2$ in an amount of 25-50%, $SiO_2$ in an amount of 0-15% and $P_2O_5$ in an amount of 26-40%.

The lithium ion conductive inorganic powder or the inorganic powder which becomes lithium ion conductive when it is heat treated should preferably have an average particle diameter of 3 μm or below and a maximum particle diameter of 15 μm or below. By this arrangement, a solid electrolyte having few voids and therefore having high ion conductivity can be provided.

Similarly, for obtaining this effect, the lithium ion conductive inorganic powder or the inorganic powder which becomes lithium ion conductive when it is heat treated should more preferably have an average particle diameter of 2 μm or below, most preferably 1 μm or below.

Similarly, for obtaining this effect, the lithium ion conductive inorganic powder or the inorganic powder which becomes lithium ion conductive when it is heat treated should preferably have a maximum particle diameter of 10 μm or below, most preferably 5 μm or below.

As the maximum particle diameter and the average particle diameter, a value measured by a particle diameter distribution measuring apparatus LS100Q or a sub-micron particle analyzer N5 made by Beckman Coulter Inc. can be used. The above described average particle diameter is a value at D50 (accumulated 50% diameter) measured by the laser diffraction method. The above described measuring apparatuses are used selectively depending upon a particle diameter of a material to be measured. In case the maximum particle diameter of a material to be measured is less than 3 μm, the sub-micron particle analyzer N5 is used for measurement. In case the minimum particle diameter of a material to be measured is 0.4 μm or over, the particle diameter distribution measuring apparatus LS100Q is used for measurement. In case the maximum particle diameter of a material to be measured is 3 μm or over and the minimum particle diameter thereof is less than 0.4 μm, LS100Q is used first and, when the peak of the distribution curve is 2 μm or over, the value obtained by LS100Q is used. When the peak of the distribution curve is less than 2 μm, a value obtained by using N5 is used. The above described average particle diameter is a value expressed on volume basis.

As the lithium ion conductive crystal to be used, a crystal which does not contain crystal grain boundary which hampers ion conduction can be advantageously used in respect of ion conductivity. As such crystal can be cited a crystal having lithium ion conductive perovskite structure such as LiN, LiSiCON and $La_{0.55}Li_{0.35}TiO_3$, $LiTi_2P_3O_{12}$ having NASICON structure or glass-ceramics which precipitate such crystal. A preferable lithium ion conductive crystal is $Li_{1+x+z}M_x(Ge_{1-y}Ti_y)_{2-x}Si_zP_{3-z}O_{12}$ where $0\leqq x\leqq 0.8$, $0\leqq y\leqq 1.0$ and $0\leqq z\leqq 0.6$, M is one or both of Al and Ga. Since glass-ceramics precipitating crystals having NASICON structure has little void and crystal grain boundary which hamper ion conduction, they have high ion conductivity and excellent chemical durability and, therefore, are particularly preferable.

By comprising a large amount of these glass-ceramics in the solid electrolyte high ion conductivity can be achieved and, therefore, the solid electrolyte should preferably contain lithium ion conductive glass-ceramics in an amount 80 wt % or over, more preferably 85 wt % or over and most preferably 90 wt % or over.

In this specification, the void and crystal grain boundary which hamper ion conduction mean ion conduction hampering elements such as void and crystal grain boundary which reduce the degree of conduction of the entire inorganic substance including the lithium ion conductive crystal to 1/10 of the degree of conduction of lithium ion conductive crystal in the inorganic substance.

Glass-ceramics in this specification mean a material which has a crystal phase precipitating in a glass phase and consists of an amorphous solid and crystal. Glass-ceramics include a material in which all of the glass phase is converted to the crystal phase on the condition that substantially no void or crystal grain boundary exists in the glass-ceramics, namely a material in which the degree of crystallization is 100 mass %.

Ceramics and other sintered materials generally cannot avoid occurrence of voids and crystal grain boundary in crystals due to the manufacturing process of such ceramics and sintered materials and glass-ceramics can be distinguished from such ceramics and sintered materials in this respect. Particularly, as regards ion conductivity, ceramics have considerably lower ion conductivity than ion conductivity of their crystal grains themselves due to existence of voids and crystal grain boundary. In glass-ceramics, decrease in conductivity between crystals can be prevented by controlling the crystallizing process whereby conductivity which is substantially equivalent to conductivity of crystal grains themselves can be maintained.

As a material other than glass-ceramics having little voids and crystal grain boundary hampering ion conduction, a single crystal of each of the above described crystals can be cited. Since, however, it is difficult to produce such single crystal and therefore manufacturing cost of such single crystal becomes very high, it is more preferable to use glass-ceramics.

Preferable lithium ion conductive glass-ceramics are glass-ceramics which are produced by heat treating mother glass of $Li_2O—Al_2O_3—TiO_2—SiO_2—P_2O_5$ type for crystallization and have a predominant crystal phase of $Li_{1+x+y}Al_xTi_{2-x}Si_yP_{3-y}O_{12}$ where preferably $0 \leqq x \leqq 1.0$, $0 \leqq y \leqq 1$, more preferably $0 \leqq x \leqq 0.4$, $0 \leqq y \leqq 0.6$ and most preferably $0.1 \leqq x \leqq 0.3$, $0.1 \leqq y \leqq 0.4$.

By using these glass-ceramics, glass can be easily obtained by casting molten glass and glass-ceramics having the above described crystal phase obtained by heat treating this glass have high lithium ion conductivity. In glass-ceramics having a similar composition to the above composition, $Al_2O_3$ may be replaced by $Ga_2O_3$ and $TiO_2$ may be replaced by GeO2. partially or wholly so long as the glass-ceramics have a similar crystal structure. For lowering the melting point of the glass or improving stability of the glass in producing glass-ceramics, other materials may be added in a small amount within a range in which ion conductivity is not deteriorated.

The composition of the glass-ceramics should not preferably comprise alkali metals other than $Li_2O$ such as $Na_2O$ and $K_2O$. When these components exist in the glass-ceramics, conduction of Li ion is obstructed due to a mixing effect of alkali ion with the result that ion conductivity is decreased. When sulfur is added to the composition of the glass-ceramics, lithium ion conductivity is increased to some extent but chemical durability and stability are deteriorated and, therefore, sulfur should not preferably be added. In the composition of the glass-ceramics, components such as Pb, As, Cd and Hg which are likely to have adverse effects to the environment and to human body should not preferably be added.

Lithium ion conductive inorganic powder, i.e., powder of glass or crystal (ceramics or glass-ceramics) having high lithium ion conductivity and chemical stability or glass powder which becomes lithium ion conductive when it is heat treated, or powder of mixture of these materials, is mixed with organic binder and, if necessary, a dispersing agent etc. by using a solvent and this mixture is formed to a green sheet by a simple forming process such, for example, as using a doctor blade. The prepared green sheet then is processed to a desired shape, pressed preferably by roll pressing or monoaxial, isotropic pressure pressing. The green sheet then is sintered and an organic component of the organic binder is thereby removed. Thus, a fully solid electrolyte in the form of a thin sheet or any desired shape can be produced.

In the case of the solid electrolyte green sheet, from the standpoint of reducing a gap after sintering, the lower limit of the amount of the lithium ion conductive inorganic powder or the inorganic powder which becomes lithium ion conductive when it is heat treated which is to be mixed with an organic binder should be preferably 50 wt %, more preferably 55 wt % and most preferably 60 wt % to the amount of the mixed slurry comprising the inorganic powder, organic binder, plasticizer and solvent. For the same reason, the upper limit of the amount of the lithium ion conductive inorganic powder or the inorganic powder which becomes lithium ion conductive when it is heat treated in the solid electrolyte after drying should be preferably 97 wt %, more preferably 94 wt % and most preferably 90 wt %.

From the standpoint of maintaining the shape of sheet, the upper limit of the amount of the lithium ion conductive inorganic powder or the inorganic powder which becomes lithium ion conductive when it is heat treated should be preferably 90 wt %, more preferably 85 wt % and most preferably 80 wt % to the amount of the mixed slurry. For the same reason, the upper limit of the amount of the lithium ion conductive inorganic powder or the inorganic powder which becomes lithium ion conductive when it is heat treated in the green sheet after drying should be preferably 97 wt %, more preferably 94 wt % and most preferably 90 wt %.

As the organic binder used for preparing of the green sheet, a binder which is commercially available as a forming additive for a doctor blade may be used. Forming additives other than the one for a doctor blade which are generally used for rubber press and extrusion molding may also be used. More specifically, acrylic resin, ethyl cellulose, polyvinyl butyral, methacrylic resin, urethane resin, butyl methacrylate and vinyl type copolymer, for example, may be used. As other materials than such binder, it is preferable to add a suitable amount of a dispersing agent for improving dispersion of particles and a surfactant for enhancing defoaming during the drying process.

For maintaining the shape of sheet, the lower limit of an amount of the organic binder should be preferably 1 wt %, more preferably 3 wt % and most preferably 5 wt % to the amount of the mixed slurry comprising the active material powder (in the case of the positive electrode or the negative electrode), inorganic powder, organic binder, plasticizer and solvent.

For the same reason, the lower limit of an amount of the organic binder in the green sheet after drying should be preferably 3 wt %, more preferably 5 wt % and most preferably 7 wt %.

For reducing the gap after sintering, the upper limit of the amount of the organic binder should be preferably 50 wt %, more preferably 40 wt % and most preferably 30 wt % to the amount of the slurry.

For the same reason, the upper limit of the amount of the organic binder in the green sheet after drying should be preferably 40 wt %, more preferably 35 wt % and most preferably 30 wt %.

For increasing electron conductivity without hampering lithium ion conductivity, other inorganic powder or organic substance may also be added. Such effect can be achieved by adding a small amount of insulating crystal or glass having a high dielectric property as an inorganic powder. As such materials, $BaTiO_3$, $SrTiO_3$, $Nb_2O_5$ and $LaTiO_3$, for example, can be cited. Since organic substance is removed during sintering, such material may be also used for adjusting viscosity of the slurry during the forming process without causing any problem.

For forming a green sheet, a simple doctor blade, roll coater or die coater may be used. If viscosity is adjusted suitably, a universal type apparatus for blending and extrusion can be used and, therefore, various shapes of solid electrolytes can be produced efficiently and cheaply.

The solid electrolyte green sheet prepared in this manner is sintered at a temperature of 1200° C. or below.

Since the solid electrolyte obtained by sintering has the shape of the formed green sheet directly or as a reduced similar figure, it can be processed to any desired shape easily and, therefore, a solid electrolyte in the form of a thin film or any other shape can be produced and a fully solid lithium ion secondary battery using this solid electrolyte can be produced. Since the solid electrolyte after sintering does not contain an organic substance, it has superior heat resistance property and chemical durability and moreover has no problem to safety and to the environment.

The volume of the thin film solid electrolyte should preferably be 55 vol % or over. By having this volume, tightening of the solid electrolyte can be realized while deformation due to shrinkage during sintering is prevented.

As the active material used in the positive electrode of the laminate consisting of the thin film solid electrolyte, positive electrode and negative electrode, a transient metal compound which can store and discharge Li ion and, as such transition metal compound, a transition metal oxide comprising at least one of Mn, Co, Ni, V, Nb, Mo, Fe, P, Al and Cr, for example, may be used.

If the amount of the active material in the positive electrode green sheet is insufficient, density tends to be low and shrinkage tends to be large after sintering. Therefore, the lower limit of the active material in the positive electrode green sheet should be preferably 40 wt %, more preferably 50 wt % and most preferably 60 wt %.

If the amount of the active material in the positive electrode green sheet is excessive, the green sheet loses flexibility and handling of the green sheet thereby becomes difficult. Therefore, the upper limit of the active material in the positive electrode green sheet should be preferably 97 wt %, more preferably 94 wt % and most preferably 90 wt %.

For obtaining a positive electrode green sheet having the above described amount of the active material and also for preparing a slurry which can be coated smoothly, the amount of the active material of the positive electrode should be preferably 10 wt % or over, more preferably 15 wt % or over and most preferably 20 wt % or over to the amount of the mixed slurry comprising the positive electrode active material powder, inorganic powder, organic binder, plasticizer and solvent.

For preparing a slurry which can be coated smoothly, the upper limit of the positive electrode active material should be preferably 90 wt %, more preferably 85 wt % and most preferably 80 wt % to the amount of the mixed slurry.

In case electron conductivity of the positive electrode active material is low, electron conductivity can be imparted by adding an electron conduction additive. As such electron conduction additive, a fine particle or fibrous carbon or metal material may be used. Metals which can be used as the electron conduction additive include Ti, Ni, Cr, Fe including stainless steel and Al and precious metals such as Pl, Au and Rh.

In this laminate for the lithium ion secondary battery, as the active material used in the negative electrode green sheet, materials which can store and discharge Li ion such, for example, as alloys of Al, Si an Sn and metal oxides such as oxides of Ti, V, Cr, Nb and Si may be used.

If the amount of the active material in the negative electrode green sheet is insufficient, density tends to be low and shrinkage tends to be large after sintering. Therefore, the lower limit of the active material in the negative electrode green sheet should be preferably 40 wt %, more preferably 50 wt % and most preferably 60 wt %.

If the amount of the active material in the negative electrode green sheet is excessive, the green sheet loses flexibility and handling of the green sheet thereby becomes difficult. Therefore, the upper limit of the active material in the negative electrode green sheet should be preferably 97 wt %, more preferably 94 wt % and most preferably 90 wt %.

For obtaining a negative electrode green sheet having the above described amount of the active material and also for preparing a slurry which can be coated smoothly, the lower limit of the amount of the active material of the negative electrode should be preferably 10 wt %, more preferably 15 wt % and most preferably 20 wt % to the amount of the mixed slurry comprising the negative electrode active material powder, inorganic powder, organic binder, plasticizer and solvent.

Since the active material must be prepared as the slurry by using a binder and solvent, the upper limit of the negative electrode active material should be preferably 90 wt %, more preferably 80 wt % and most preferably 75 wt % to the amount of the mixed slurry.

In case electron conductivity of the negative electrode active material is low, electron conductivity can be imparted by adding an electron conduction additive. As such electron conduction additive, a fine particle or fibrous carbon or metal material may be used. Metals which can be used as the electron conduction additive include Ti, Ni, Cr, Fe including stainless steel and Al and precious metals such as Pl, Au and Rh.

For imparting ion conductivity, it is preferable to add the lithium ion conductive inorganic powder to the positive electrode green sheet and the negative electrode green sheet. More specifically, these green sheets may comprise the lithium ion conductive glass-ceramics. It is more preferable to add the ion conductive inorganic powder that is the same as the one added to the solid electrolyte green sheet. By adding the same inorganic powder in this manner, the ion moving mechanism of the electrolyte becomes common to the ion moving mechanism of the electrodes whereby ion movement between the electrolyte and the electrodes can be performed smoothly and a battery having a higher output and higher capacity can be provided.

In the case of the positive electrode green sheet, for imparting ion conductivity, the lower limit of the amount of the lithium ion conductive inorganic powder to be mixed with the organic binder should be preferably 1 wt %, more preferably 3 wt % and most preferably 5 wt % to the amount of the mixed slurry comprising the positive electrode active material powder, inorganic powder, organic binder, plasticizer and solvent.

For the same reason, the lower limit of the amount of the lithium ion conductive inorganic powder in the positive electrode green sheet after drying should be preferably 3 wt %, more preferably 5 wt % and most preferably 10 wt % to the amount of the mixed slurry.

If the amount of the lithium ion conductive inorganic powder is excessive, the amount of the active material is small with resulting decrease in the capacity of the battery. Therefore, the upper limit of the amount of the lithium ion conductive inorganic powder should be preferably 50 wt %, more preferably 40 wt % and most preferably 30 wt % to the amount of the mixed slurry.

For the same reason, the upper limit of the amount of the lithium ion conductive inorganic powder in the positive electrode green sheet after drying should be preferably 70 wt %, more preferably 60 wt % and most preferably 50 wt % to the amount of the mixed slurry.

In the case of the negative electrode green sheet, for imparting ion conductivity, the lower limit of the amount of the lithium ion conductive inorganic powder to be mixed with the organic binder should be preferably 1 wt %, more preferably 3 wt % and most preferably 5 wt % to the amount of the mixed slurry comprising the negative electrode active material powder, inorganic powder, organic binder, plasticizer and solvent.

For the same reason, the lower limit of the amount of the lithium ion conductive inorganic powder in the positive electrode green sheet after drying should be preferably 3 wt %, more preferably 5 wt % and most preferably 10 wt % to the amount of the mixed slurry.

If the amount of the lithium ion conductive inorganic powder is excessive, the amount of the active material is small with resulting decrease in the capacity of the battery. Therefore, the upper limit of the amount of the lithium ion conductive inorganic powder should be preferably 50 wt %, more preferably 40 wt % and most preferably 30 wt % to the amount of the mixed slurry.

For the same reason, the upper limit of the amount of the lithium ion conductive inorganic powder in the negative electrode green sheet after drying should be preferably 70 wt %, more preferably 60 wt % and most preferably 50 wt % to the amount of the mixed slurry.

The positive electrode green sheet and the negative electrode are produced in the same manner as the thin film solid electrolyte is produced.

After an adherent such as acetone is sprayed over one surface of the solid electrolyte which has already been sintered, the positive electrode green sheet produced in the above described manner is deposited and dried. Then, the laminate of the solid electrolyte and the positive electrode green sheet is sintered at a temperature which is lower by 50° C. or over than the sintering temperature of the solid electrolyte (1200° C. or below). This temperature is a temperature at which, when the positive electrode green has been completed as a positive electrode, no deformation in the laminate takes place and the positive electrode can perform the best function as a battery.

After completion of sintering of the positive electrode, the negative electrode green sheet is laminated on the other surface of the solid electrolyte in the same manner as in laminating of the positive electrode green sheet and the laminate is sintered at a temperature which is the same as or lower than the sintering temperature at which the positive electrode is sintered.

A positive electrode collector is formed on the positive electrode side of the laminate consisting of the thin film solid electrolyte, the positive electrode and the negative electrode by a known method such as coating an aluminum paste on the positive electrode side and drying and sintering the aluminum paste. Likewise, a negative electrode collector is formed on the negative electrode side of the laminate by a known method such as coating a cupper paste on the negative electrode side and drying and sintering the cupper paste. A positive electrode lead is connected to the positive electrode side and a negative electrode lead is connected to the negative electrode side and thus the lithium ion secondary battery is completed.

EXAMPLE 1

Production of a Solid Electrolyte

As raw materials, $HaPO_4$, $Al(PO_3)$, $Li_2CO_3$, $SiO_2$ and $TiO_2$ were used. These raw materials were weighed to obtain a composition in mol % on oxide base having 33.8% $P_2O_5$, 7.6% $Al_2O_3$, 14.5% $Li_2O$, 41.3% $TiO_2$ and 2.8% $SiO_2$. The raw materials were mixed uniformly and then put in a platinum pot. The raw materials were heated and melted while being stirred in an electric furnace at 1450° C. for three hours to provide molten glass.

Then, the molten glass was dripped into flowing water and glass in the form of a flake was obtained. The glass flake was crushed by a jet mill and fine particles of glass having an average particle diameter of 1.9 μm was produced. The glass was further crushed to finer particles by a wet ball mill using ethanol and a slurry thus obtained was dried by spray drying to provide fine particles of glass having an average particle diameter of 0.3 μm. A dispersing agent was added to a mixture of the fine particles of glass and acrylic resin dispersed in water. The mixture was stirred in a ball mill for 48 hours to provide a slurry. In this slurry, the amount of the fine particles of glass was 65.5 mass % and the amount of the acrylic resin was 13.5 mass %. The slurry was formed to thickness of 35 μm by using a doctor blade on a PET film which was previously subjected to a release process. The formed slurry was first dried at 80° C. and then dried again at 95° C. to provide a green sheet. This green sheet was cut to rectangular sheets each having a width of 50 mm and three sheets of them were laminated together and the laminate was heat treated at 1020° C. for 30 minutes as first treatment temperature. The heat treated laminate was measured by the X-ray diffraction method and it was confirmed that it had a predominant crystal phase of $Li_{1+x+y}Al_xTi_{2-x}Si_yP_{3-y}O_{12}$ where $0 \leqq x \leqq 0.4$ and $0 \leqq y \leqq 0.6$. Impedance of the laminate was measured and ion conductivity thereby was measured. Ion conductivity measured was $3.1 \times 10^{-4} \cdot Scm^{-1}$ and it was confirmed that a thin film solid electrolyte was produced.

Forming of a Positive Electrode on the Solid Electrolyte

The above described glass in the form of a flake was heat treated at 1000° C. for 5 hours to produce a solid electrolyte in the form of a flake having a predominant crystal phase of $Li_{1+x+y}Al_xTi_{2-x}Si_yP_{3-y}O_{12}$ where $0 \leqq x \leqq 0.4$ and $0 \leqq y \leqq 0.6$ and ion conductivity of $6.8 \times 10^{31\ 4} \cdot Scm^{-1}$. The solid electrolyte in the form of a flake was crushed by a jet mill and a ball mill to provide solid electrolyte powder having an average particle diameter of 0.2 μm. In a ball mill, the solid electrolyte powder was mixed with commercially available $LiCoO_2$ having an average particle diameter of 5 μm at a ratio in weight of the solid electrolyte powder: $LiCoO_2$=1:8. The mixture and acrylic resin dispersed in water were added with a dispersing agent and the mixture was stirred in a ball mill for 48 hours to provide a slurry. In the slurry, the amount of mixture of the solid electrolyte and $LiCoO_2$ was 63.4 mass % and the amount of acrylic resin was 12.3 mass %. The mixture was formed to thickness of 95 μm by using a doctor blade on the thin film solid electrolyte. The laminate was dried first at 80° C. and then dried again at 95° C. The laminate was then heat treated at 800° C. as second heat treatment temperature and a positive electrode thereby was formed on the thin film solid electrolyte.

Forming of a Negative Electrode on the Solid Electrolyte Having the Positive Electrode A commercially available Li4/3Ti5/304 having an average particle diameter of 7.5 μm was crushed to powder having an average particle diameter of 1.4 μm by a wet ball mill and mixed with the solid electrolyte powder by a ball mill at a ratio in weight of the solid electrolyte powder: Li4/3Ti5/304=1:5. The mixture and acrylic resin dispersed in water were added with a dispersing agent and the mixture was stirred in a ball mill for 48 hours to provide a slurry. In the slurry, the amount of mixture of the solid electrolyte and Li4/3Ti5/304 was 60.8 mass % and the amount of acrylic resin was 14.8 mass %. The mixture was formed to thickness of 90 μm by using a doctor blade on the thin film solid electrolyte. The laminate was dried first at 80° C. and then dried again at 95° C. The laminate was then heat treated at 650° C. as third heat treatment temperature and a negative electrode thereby was formed on the thin film solid electrolyte.

Production of a Fully Solid Lithium Ion Secondary Battery

A positive electrode collector was formed on the positive electrode side of the laminate made in this manner by coating an aluminum paste and then drying and sintering it. A negative electrode collector was formed on the negative electrode side by coating a cupper paste and then drying and sintering it. An aluminum foil was connected to the positive electrode side to form a positive electrode lead and a cupper foil was connected to the negative side to form a negative side lead. The assembly was sealed in a laminate film made of aluminum which was coated with an insulating material on the inner side thereof and a lithium ion secondary battery thereby was completed. The battery could be charged and discharged and could discharge at an average voltage of 2.5V.

EXAMPLE 2

Forming of a Positive Electrode

The slurry containing $LiCoO_2$ obtained in Example 1 was cast on a PET film which had been subjected to a release treatment and was dried first at 80° C. and then dried again at 95° C. to provide a positive electrode green sheet. Two sheets of the positive electrode green sheet were superposed one upon the other and were laminated by using CIP (cold isotropic pressure pressing) at 196.1 MPa. The positive electrode green sheet laminate provided in this manner had a specific gravity which was 1.4 fold of one sheet of the positive electrode green sheet.

Forming of a Negative Electrode

The slurry containing Li4/3Ti5/304 obtained in Example 1 was cast on a PET film which had been subjected to a release treatment and was dried first at 80° C. and then dried again at 95° C. to provide a negative electrode green sheet. Two sheets of the negative electrode green sheet were superposed one upon the other and were laminated by using CIP (cold isotropic pressure pressing) at 196.1 MPa. The negative electrode green sheet laminate provided in this manner had a specific gravity which was 1.3 fold of one sheet of the negative electrode green sheet.

Production of a Fully Solid Lithium Ion Secondary Battery

Acetone was sprayed on one surface of the thin film solid electrolyte obtained in Example 1 and the positive electrode green sheet was adhered to this surface. The laminate was dried first at 40° C. and dried again at 60° C. and then heat treated at 800° C. as second heat treatment temperature to form a positive electrode on the solid electrolyte. Acetone was sprayed on the other surface of the solid electrolyte, i.e., opposite side of the positive electrode, and the negative electrode green sheet was adhered to this surface. The laminate was dried first at 40° C. and dried again at 60° C. and then heat treated at 650° C. as third heat treatment temperature to form a negative electrode on the solid electrolyte.

A positive electrode collector was formed on the positive electrode side of the laminate made in this manner by coating an aluminum paste and then drying and sintering it. A negative electrode collector was formed on the negative electrode side by coating a cupper paste and then drying and sintering it. An aluminum foil was connected to the positive electrode side to form a positive electrode lead and a cupper foil was connected to the negative side to form a negative side lead. The assembly was sealed in a laminate film made of aluminum which is coated with an insulating material on the inner side thereof and a lithium ion secondary battery thereby was completed. The battery could be charged and discharged and could discharge at an average voltage of 2.5V.

The invention claimed is:

1. A method for manufacturing a lithium ion secondary battery comprising: preparing a first green sheet comprising at least one of lithium ion conductive inorganic powder and inorganic powder which becomes lithium ion conductive when it is heat treated; heat treating the first green sheet at a first temperature obtaining a thin film solid electrolyte; laminating a second green sheet comprising a first electrode active material and said at least one of the lithium ion conductive inorganic powder and the inorganic powder contained in the first green sheet on a first surface of the thin film solid electrolyte; heat treating the second green sheet at a second temperature which is lower than the first temperature by 50° C. or more; laminating a third green sheet comprising a second electrode active material and said at least one of the lithium ion conductive inorganic powder and the inorganic powder contained in the first green sheet on a second surface of the solid electrolyte; and heat treating the third green sheet at a third heat treating temperature which is the same as or lower than the second heat treating temperature; wherein the lithium ion conductive inorganic powder has crystals of $Li_{1+x+z}M_x(Ge_{1-y}Ti_y)_{2-x}Si_zP_{3-z}O_{12}$ ($0 \leqq x \leqq 0.8$, $0 \leqq y \leqq 1.0$, $0 \leqq z \leqq 0.6$ and M is one or both of Al and Ga).

2. A method as defined in claim 1 wherein the first heat treating temperature is 1200° C. or below.

3. A method as defined in claim 1 wherein the thin film solid electrolyte has a volume of 50% or more of an original volume of the first green sheet from which the thin film solid electrolyte is produced.

4. A method as defined in claim 1 wherein the thin film solid electrolyte has thickness of 500 μm or below.

5. A method as defined in claim 1 wherein the lithium ion conductive inorganic powder or the inorganic powder which becomes lithium ion conductive when it is heat treated has an average particle diameter of 3 μm or below and a maximum particle diameter of 15 μm or below.

6. A method as defined in claim 1 wherein ion conductivity of the lithium ion conductive inorganic powder or ion conductivity after the heat treatment of the inorganic powder which becomes lithium ion conductive when it is heat treated is $1\times10^{-4}S\cdot cm^{-1}$ or over at 25° C.

7. A method as defined in claim 6 wherein ion conductivity after the heat treatment of the green sheet comprising the lithium ion conductive inorganic powder or the inorganic powder which becomes lithium ion conductive when it is heat treated is $5\times10^{-5}S\cdot cm^{-1}$ or over at 25° C.

8. A method as defined in claim 1 wherein the inorganic powder which becomes lithium ion conductive when it is heat treated comprises, in mol % on oxide basis:

| | |
|---|---|
| $Li_2O$ | 10-25% |
| $Al_2O_3$ and/or $Ga_2O_3$ | 0.5-15% |
| $TiO_2$ and/or $GeO_2$ | 25-50% |
| $SiO_2$ | 0-15% and |
| $P_2O_5$ | 26-40%. |

9. A lithium ion secondary battery manufactured by a method as defined in any of claims 1, 2 and 3-8.

* * * * *